July 3, 1923.
C. W. BAIN
PNEUMATIC TIRE PROTECTOR
Filed March 17, 1922
1,460,781
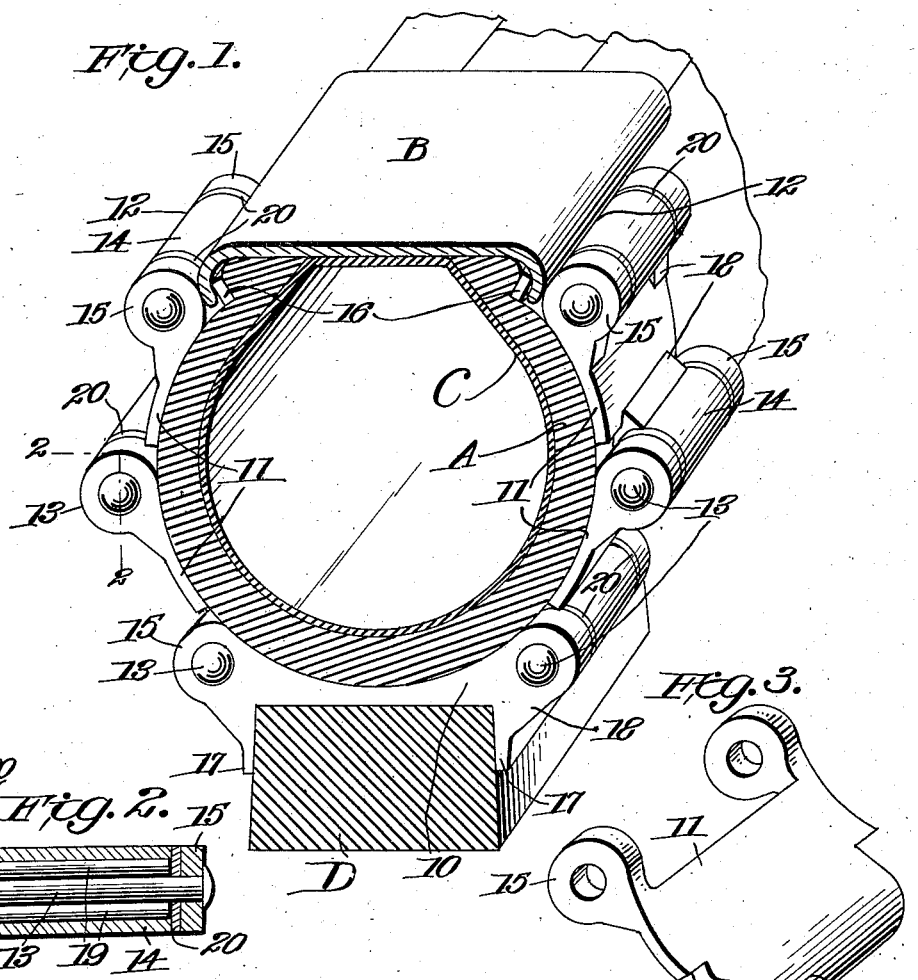
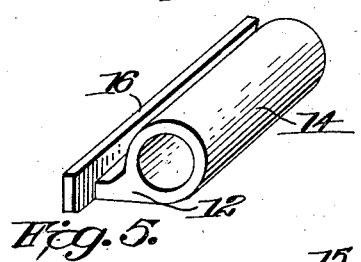
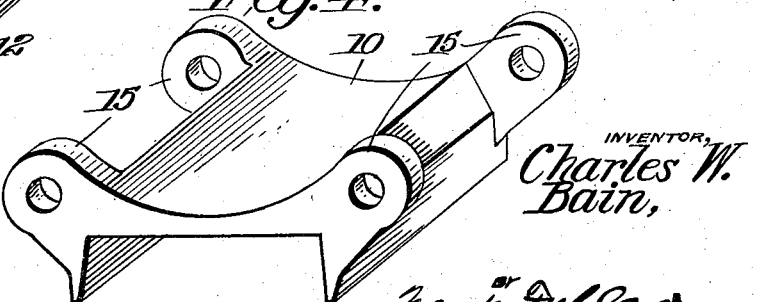

Patented July 3, 1923.

1,460,781

UNITED STATES PATENT OFFICE.

CHARLES W. BAIN, OF INDIANAPOLIS, INDIANA.

PNEUMATIC-TIRE PROTECTOR.

Application filed March 17, 1922. Serial No. 544,593.

*To all whom it may concern:*

Be it known that CHARLES W. BAIN, a citizen of the United States, residing at Indianapolis, in the county of Marion and State of Indiana, has invented certain new and useful Improvements in Pneumatic-Tire Protectors, of which the following is a specification.

This invention relates to a pneumatic tire protector.

One important object is to provide a construction improved over that of my Patent 1,275,199, granted Aug. 13, 1918 in that it will be more flexible for yielding with the tire, in which the parts will have substantially frictionless movement, and in which the parts are extremely substantial, durable and capable of being hooked to the rim of the tire.

Additional objects and advantages will become apparent from a consideration of the description following taken in connection with the accompanying drawings illustrating one practical embodiment.

In said drawings:—

Fig. 1 is a view in perspective showing my improvements associated with a tire and rim fragmentarily;

Fig. 2 is a cross sectional view on the line 2—2 of Fig. 1;

Fig. 3 is a detail perspective of one of the side leaves employed;

Fig. 4 is a detail perspective view of one of the tread plates employed and

Fig. 5 is a detail perspective view of one of the hook leaves employed.

Like reference characters designate like or corresponding parts in the different views.

By way of example, a tire shoe or casing is shown at A mounted in the usual channel rim B and having the usual pneumatic tube C. This conventional representation will illustrate the practice of the invention.

The invention consists of a tread plate or leaf 10 and side plates or leaves 11, preferably a plurality on each side thereof, and anchoring or securing plates 12. These plates are adapted to be connected together by pivot rods such as 13 which pass through barrels 14 on some of them and lugs 15 on some of them. The plate 10 merely has such lugs 15 at each side. Plates 11 at one side have one of the barrels 14 and at the other have the lugs 15. Plates 12 merely have one of the barrels 14. The barrels 14 interfit between the lugs 15 as seen in Figs. 1 and 2.

On the plates 12, bars 16 are provided which serve as hooks or anchors to hook detachably over the side edges of the rim B for disposition intermediate the rim and shoe A to retain the protector in place.

The protectors are employed in any desired number about the tire and a tread of any suitable design as at D is preferably retained by the plates 10, through the medium of suitable side flanges at 17. The particular mounting means of the tire of course is immaterial and a limitation to the same as shown is not to be inferred.

Attention is called to the fact that the different plates are bodily curved to conform to the tire and that the plates 11 may be reinforced as at 18 when desired.

A very important feature resides in the anti-friction connection of the plates. Within each barrel 14, a plurality of bearing rods or rollers 19 are disposed about the rods 13. In order to maintain the rollers 19 within the barrels without possibility of interference with the adjacent plates, disks 20 are disposed on the rods 13 intermediate the barrels 14 and lugs 15. As a result of these disks, the end thrust of the rollers 19 does not even occur against the lugs 15 and hence smooth substantially frictionless yielding of the plates is permitted.

As will be realized, the wear is direct on the tread D, and its movement is resiliently cushioned by the tire A as the plates 10, 11 and 12 yield for movement on their pivots 13, and that such plates protect the tire.

As merely one practical embodiment has been illustrated and described, it is to be understood that changes in the details may be made within the spirit and scope of the invention as defined by the appended claim.

I claim as my invention:—

A tire protector consisting of a plurality of plates to surround the tire, anchoring hook flanges extending from two of said plates, certain of said plates having lugs, certain of said plates plates having barrels to fit intermediate said lugs, disks intermediate said lugs and barrels, pivot rods passing through said lugs, barrels and disks, and bearing members in said barrels to abut said disks at the ends of the bearing members.

In testimony whereof I affix my signature.

CHARLES W. BAIN.